Dec. 8, 1964 R. L. FISCHER 3,160,213
FEATHER CONTROL FOR AERONAUTICAL PROPELLERS
Filed Aug. 2, 1961 2 Sheets-Sheet 2

INVENTOR
RICHARD L. FISCHER
BY *Norman Friedland*
AGENT 3,160,213
FEATHER CONTROL FOR AERONAUTICAL
PROPELLERS
Richard L. Fischer, Suffield, Conn., assignor to United
Aircraft Corporation, East Hartford, Conn., a corporation of Delaware
Filed Aug. 2, 1961, Ser. No. 128,782
5 Claims. (Cl. 170—160.2)

This invention relates to control systems for variable pitch propellers and particularly to speed responsive governors and constitutes an improvement in the mechanism disclosed in my U.S. Patent No. 2,975,794.

In heretofore designed variable pitch propellers as shown in the referred to Patent No. 2,975,794 to effect feathering of the blade a governor, which generally comprises a speed responsive device, and a valve cooperating therewith directs pressurized fluid to a hydraulic motor which cooperates with the propeller blades for moving them in the proper direction. Even propellers utilizing well-known bypass feathering valves which bypass the governor to effectuate feathering, the governor, for safety reasons, is simultaneously caused to move so as to also effectuate feathering. In these heretofore governors, the governor pilot valve is generally designed to carry an extra land which is rendered inoperative during normal control operations but is subjected to hydraulic pressurized fluid to cause the pilot valve to move in such a feathering position so as to effect feathering of the blades. Another method of accomplishing feathering by heretofore designed governors is to employ a separate actuating mechanism including a mechanical connection to the governor pilot valve for mechanically positioning the pilot valve in a direction to initiate feathering of the propeller blades.

In the interest of reducing size, complexity, weight, and cost of the governor, I have devised a simple shuttle valve mechanism which cooperates with the governor pilot valve and is self-actuating to cause the governor to move in its feathering position. Such a device obviates the disadvantages of the heretofore governor feathering systems enumerated above since it requires a minimum of component parts conserves space, is lighter, more economical and minimizes the possibility of mechanical failure. The shuttle valve is interposed between the positioning chamber of the governor and the usual metering land which meters the pressure to said chamber and is in communication with the feathering fluid line. In this manner, the shuttle valve is exposed to servo meter pressure at one end and drain or sump pressure at the other end so that during normal operation, since drain pressure is lower than the metering pressure, the governor pilot valve functions in its normal manner. When feathering is initiated, pressurized feathering fluid is directed to the shuttle valve and since this pressure is higher than the servo metered pressure the shuttle valve will position to direct the high pressure fluid directly into the positioning chamber. The pilot valve of the governor is so arranged that when in this condition the valve will direct fluid to the pitch changing motor of the propeller to cause the blades to move in their feathering position.

It is therefore an object of this invention to provide in a device as described a self-energizing valve means to cause feathering of the variable pitch propeller.

Still another object of this invention is to provide in a governor as described simplified means for causing the governor pilot valve to move in the feathering position so as to effect feathering of the propeller blades and being characterized as being extremely reliable in operation, economical to build, conserving space, light weight and is simple in construction but capable of rugged use.

Other features and advantages will be apparent from the specification and claims and from the accompanying drawings which illustrate an embodiment of the invention.

Figure 3:
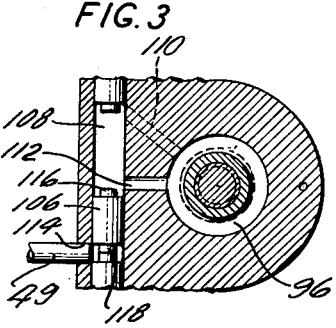
FIG. 3 is a partial sectional view taken along line 3—3 and showing the shuttle valve in the normal control position.
Figure 3A:
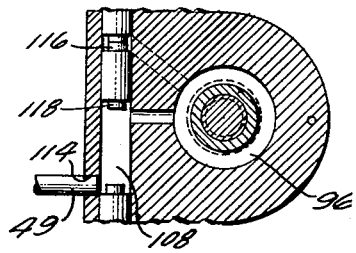

FIG. 3a, like FIG. 3, is a partial sectional view taken along line 3—3 and showing the shuttle valve in the feathering position.

Figure 1:
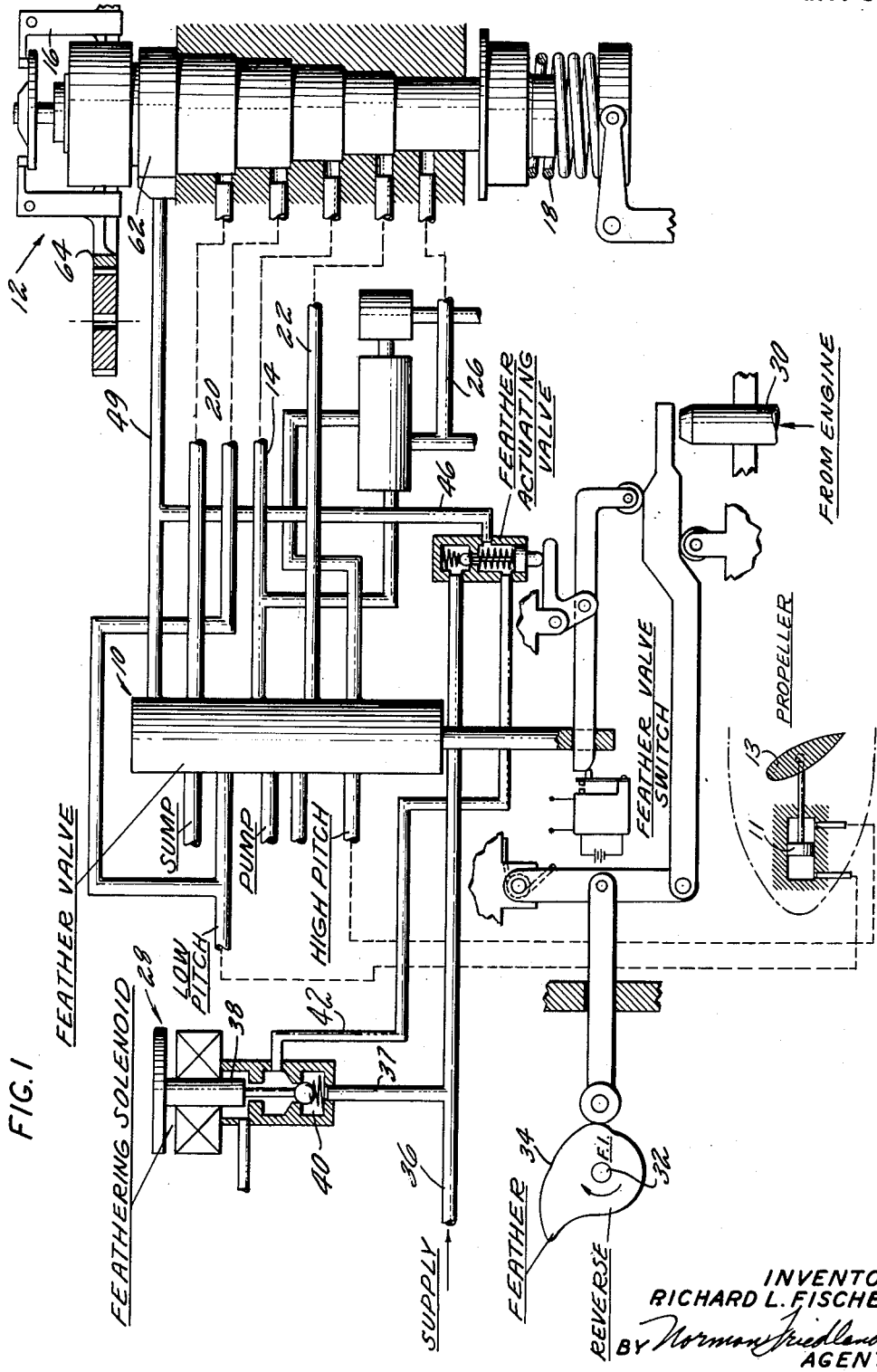
FIG. 1 is a schematic illustration of a preferred embodiment of this invention.

Referring more specifically to the drawings for illustrative purposes, FIG. 1 schematically illustrates the governor control system which in its normal operation directs pressurized fluid to the hydraulic pitch change motor 11 located in the dome of a propeller shown in phantom so as to vary the pitch of the blades 13 in either direction. This system is generally like the system disclosed in my copending U.S. application 76,747 filed December 19, 1960, now Patent No. 3,090,445, assigned to the same assignee and for more details reference is hereby made thereto. In essence, fluid pressurized by the main pump (not shown) is fed into the feathering valve generally indicated by numeral 10 and is delivered to the governor generally indicated by numeral 12 through line 14. The governor pilot valve responding to the force of flyweights 16 and the force exerted by speeder spring 18 causes fluid to be directed to the pitch changing motor to obtain the proper pitch for maintaining the proper speed conditions of the aircraft. The height of the speeder spring is adjusted by the pilot lever for establishing a force for setting the desired speed. The flyweights are coupled to the propeller so that rotational movement of the flyweights will cause the same to balance the force of the speeder spring to achieve the correct aircraft speed as set by the pilot lever. For example, as the propeller is in an overspeed condition, the flyweights (due to centrifugal force) will move radially outward to position the governor pilot valve so that pressurized pump fluid entering the governor through line 14 will be directed to pass through line 22 where it is directed to the high pitch side of the pitch changing motor causing each propeller blade to rotate along its longitudinal axis toward high pitch. This causes a reduction of speed of the propeller which in turn permits the flyweights to return back to their normal vertical position. In this manner the governor pilot valve is again placed in the balanced line-on-line position. Conversely, if the propeller was in an underspeed condition the flyweights would move radially inwardly so that the force of speeder spring 18 now overcomes the centrifugal force of the flyweights 16. The pressurized pump discharge fluid in this condition is directed through line 20 to the low pitch side of the pitch changing motor to effect a reduction of pitch for returning the speed of the propeller to its "on-speed" condition. Of course, when either side of the pitch change valve is receiving pressurized fluid the governor pilot valve communicates the opposite side of the pitch change with a lower pressure; namely, sump pressure for venting the fluid of the pitch change motor. Thus, as shown in FIG. 1, lines 24 and 26 are connected to the sump for effecting the functions immediately described above.

The feathering of the propeller control system may be initiated in several ways, as for example, by actuating the feather solenoid generally indicated by numeral 28 or from the engine negative torque push rod generally indicated by numeral 30 or by rotating the pilot lever which causes rotation of shaft 32 which carries thereon cam 34. For purposes of describing this invention and for convenience, it is only necessary to explain the operation of one of the mechanisms since any one of the many ways of initiating feather causes high pressurized fluid to be conducted to the feathering lines as will be more fully described hereinbelow.

Figure 2:
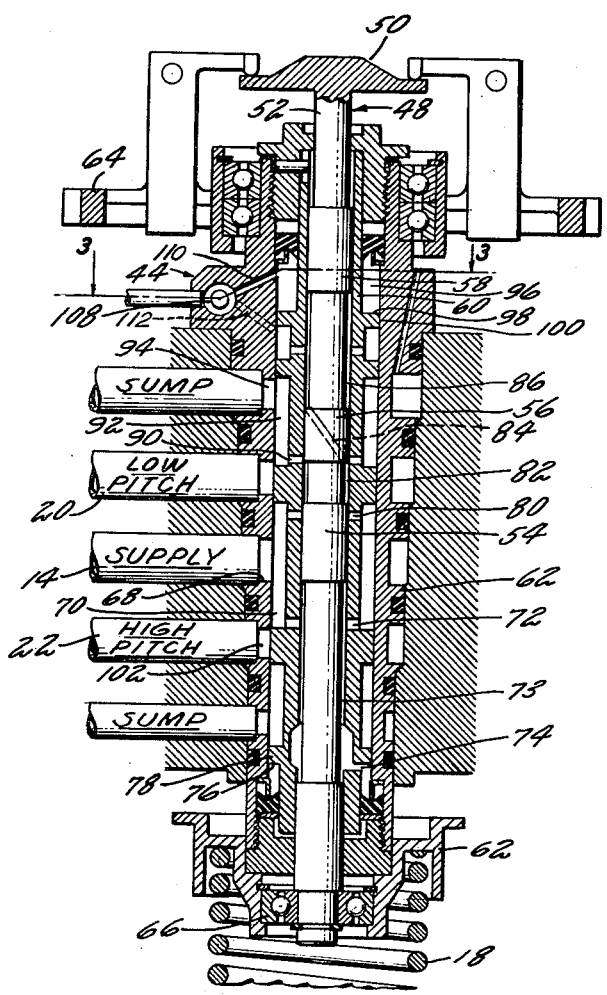
FIG. 2 is a detailed drawing partly in section and partly in elevation.

Thus, for example, and still referring to FIG. 1, if the pilot should depress the feathering button (not shown) located in the cockpit of the aircraft, the feathering solenoid 28 will be energized causing rod 38 to unseat the spring biased ball valve 40, allowing the pressurized fluid, which is always evidenced in line 36, to be conducted through lines 42, 46, and 49 to the shuttle valve generally indicated by numeral 44. As will become apparent from the description to follow, the shuttle valve will allow communication to the positioning chamber of the pitch changing valve which is housed in the governor 12 for causing the governor to move in the feathering position. As can be seen in FIG. 2, the governor comprises flyweights 16 and pilot valve 48 which has a flange member 50 radially extending to engage the foot of the flyweights. Pilot valve 48 comprises an elongated valve stem 52 and lands 54, 56, and 58. A coaxial pitch changing valve 60 surrounds the valve stem 52 and responds to the position of pilot valve 48. Speeder spring 18 engages a spring retaining member 62 secured to the lower end of the valve stem 52 for biasing the valve stem in an upward direction and flyweights 16 engage flange member 50 for urging valve stem 48 in the opposite direction. The valve stem may be supported in member 62 by bearing 66 so that there will be relative rotary motion between itself and the pitch changing valve. Thus it is apparent that valve stem responds to the centrifugal force imparted to the flyweights 16 which is caused to rotate by gear 64 and force imparted by spring 18. Port 68 receives high pressure fluid from the pump through line 14 where a portion of the fluid is directed to annular groove 70, to annular groove 72, and into the annular groove 73 formed between the valve stem and the pitch change valve where it is directed to the lower end of the pitch change valve through passage 74. In this manner, the high pressure fluid acts on the reaction surface 76 of land 78. It will be noted that the pressurized pump fluid is continuously directed into this chamber formed by the lower land 78 and housing 62. The pump pressurized fluid ingressing into port 68 is also directed to annulus 80 into annular groove 82 through drill passage 84 and through annulus 86. Land 54 cooperates with annulus 80 to meter the pressure fluid in accordance with the position of valve stem 52. Thus, as the valve stem 52 is moved downwardly, the fluid in annulus 80 is put into communication with the annular groove 82 causing the fluid to ingress through passage 84. If, on the other hand, the valve stem 52 is caused to move upwardly, annulus groove 82 conducts fluid to annulus 90 which is in communication with the sump pressure through annular groove 92 and port 94. The fluid contained in the annular groove 86 is directed through passage 110 through the shuttle valve 44 through passage 112 and into the positioning chamber 96 formed between the pitch changing valve and the housing 62. The pressurized fluid acts on the reaction surface 98 formed on land 100. It will be appreciated as shown in FIG. 2, that the area of the reaction surface 98 is larger than the area of the reaction area 76 on land 78, a suitable ratio of these areas may be in the order of 2 to 1.

From the foregoing, it is apparent that the pitch changing valve responds to the position of the pilot valve for directing fluid to the pitch changing chamber as was described. Thus, for example, as the valve stem 52 is urged downwardly in response to an overspeed condition the pilot valve will direct fluid to the positioning chamber 96 which in turn causes the pitch changing valve to also move downwardly. This motion causes land 101 to uncover port 102 and direct fluid to line 22 (shown in FIG. 1) where it is conducted to the pitch changing motor to effect a correction of the pitch of the blades. The flyweights sensing the corrected speed returns to their original vertical position. Thus, as the pilot valve is urged upwardly by speeder spring 18, fluid from chamber 96 is vented through drain port 94 and lands 54 and 56 will cooperate with annulus 80 and 90 respectively to bring the pilot valve into a balance position. It will be noted that when the pump pressure was directed through port 68 and port 102, the low pitch line 20 (as shown in FIG. 1) was venting fluid to drain port 94 by way of annulus 90 and annular groove 92.

In accordance with the present invention, shuttle valve 44 is disposed in the cavity drilled into the housing 62 and is interposed between the positioning chamber 96 and the pilot valve servo metered pressure entering annulus 86. The normal governing control operating the shuttle valve 44 is in a position so as not to obstruct fluid flow from the pilot valve to the positioning chamber 96.

Referring to FIG. 3 which shows shuttle valve 44 comprising a valve element 106 and cavity chamber 108, illustrating as was described above that the fluid in annulus 86 is directed through drill passage 110 in the cavity 108 and thence through drill passages 112 and into positioning chamber 96. When feathering is initiated by the methods mentioned in the above, high pressure fluid is conducted through line 49 which registers with port 114 and into cavity 108. Since this pressure is higher then the meter pressure in existence in the cavity, the valve will be caused to shift to the left and directly communicates the pitch positioning chamber 96 with high pressure fluid. Since the pressurized fluid acting in the positioning chamber 96 is equal to the pressure acting on reaction surface 76, pitch changing valve will be caused to move downwardly for directing the pump pressure to the high pitch line 22 to effect feathering of the propeller blades in the manner described in the above. It will be noted from the drawing that valve element 106 may carry axial abutments 116 and 118 which serves to allow communication of fluid on either end of the valve element. This is necessary to allow the pressure to act on the end of the valve element in order to cause it to shift in either of extreme directions. It will be noted that during normal governing the end of the valve element 106, which receives the feathering pressurized fluid, is communicated to drain or sump pressure.

Now that the present invention has been described in detail, the operation thereof will now be illustrated. In the event the pilot should initiate feathering as for example by actuating the feathering solenoid 28, valve 40 will unseat conducting pressurized fluid from line 36 to branch line 37 to line 42 through the feathering actuating valve and then through lines 46 and 49 then into shutter valve 44. The shuttle valve responding to this high pressure will be caused to shift upwardly as shown in FIG. 3a and hence directing high fluid directly into the positioning chamber 96. The high pressure fluid acting therein causes the pitch changing valve to move downwardly thus connecting line 14 with line 22 for placing high pressure fluid into the pitch changing motor of the propeller for causing the pitch of the blades to rotate into the feathering position. In unfeathering, the feathering pressure acting on valve element 106 is vented to drain so that the normal pilot valve metering pressure shifts the shuttle valve to the right for allowing the pilot valve to regain control of the pitch changing valve.

What is shown by the present invention is a simplified valving arrangement which obviates the requirements of levers and pistons and valving as was exemplified in heretofore known governors.

This arrangement, therefore, provides a rugged device which is highly reliable, simple in construction, economical to manufacture, and also affording a reduction in weight and size which are of extreme importance particularly in the aircraft art.

It is to be understood that the invention is not limited to the specific embodiment herein illustrated and described, but may be used in other ways without departing from its spirit as defined by the following claims.

I claim:
1. In combination, a variable pitch propeller having a servo motor, means responsive to the speed of the propeller for positioning said servo motor, said speed responsive means comprising a pilot valve including fluid regulating means, a ported servo device for controlling the application of fluid to said servo motor as a function of the position of the fluid regulating means of said pilot valve, a fluid receiving chamber formed on one end of said servo device receiving fluid from said fluid regulating means, a valve including a pressure responsive moveable element moveable to a first and second position located between said pilot valve and said chamber and normally in the first position, said valve responsive to a source of fluid pressure for positioning said element to the second position so as to bypass the fluid regulating means whereby said servo device is positioned to one extreme position regardless of the position of said pilot valve.

2. Feather actuating means for a controllable pitch propeller having a speed responsive pitch control governor, said governor comprising a pilot valve, a servo motor responsive to the position of said pilot valve, said servo motor having a moveable member having a first reaction surface and second opposing reaction surface, a source of fluid under pressure, first passage means for directing the flow of fluid from said source to said first and second reaction surfaces, fluid regulating means cooperating with said passage means for metering the flow of fluid from said source but at a lower pressure at said source to the first reaction surface, a valve having a first and second position located between said pilot valve and said first reaction surface, second passage means for directly communicating said second reaction surface with said source, said valve normally held in said first position in accordance with the pressure of the fluid discharging from said pilot valve, means for admitting fluid into said valve for moving said valve in the other of said positions for admitting fluid from said source whose pressure is higher than the pressure being metered by said fluid regulating means to act against said first reaction surface for causing said servo piston to move to an extreme feathering position in opposition to the force imparted by said second reaction surface.

3. A speed responsive fluid control system in combination with a variable pitch propeller moveable to a feathering position comprising a pitch changing motor, a pilot valve responding to the speed of said propeller for positioning said pitch changing motor, a ported housing surrounding said pilot valve, a ported sleeve mounted in said housing and adjacent said pilot valve, said sleeve carrying a plurality of lands cooperating with the ports of said housing for defining a plurality of variable orifices, a source of fluid under pressure said pilot valve carrying a land cooperating with a port of said sleeve for controlling the flow of fluid to an end surface formed in the sleeve so as to position the sleeve in accordance with the position of the pilot valve and establish areas in said orifices for communicating said source with said pitch changing motor, a valve in said housing located between said ported sleeve and the pilot valve and moveable to a first and second position, feathering means including coordinating control means for feathering the propeller, said valve normally held in the first position by the pressure of the fluid metered by said pilot valve, said feathering means also including means for directing fluid from said source to said valve for positioning said valve to said second position so as to place said end surface into communication with said source whereby the sleeve is moved to an extreme position for effectuating feathering of said propeller.

4. A servo governor for maintaining the speed of a rotating member at a constant value comprising a ported housing having a moveable valve element, a source of fluid under pressure, a ported sleeve surrounding said valve element and interposed between said housing and said moveable element, said sleeve having a plurality of lands cooperating with the ports of said housing for regulating the flow of fluid therethrough, said moveable element having a land cooperating with one of the ports of said sleeve for directing fluid into a chamber formed on one end of said sleeve, means cooperating with said moveable element and responsive to the speed of the rotating member for positioning said element for directing fluid in said chamber to position said sleeve so as to define the openings formed by the lands in the sleeve and the ports in the housing, a valve in said housing having connection means communicating a passage formed in said moveable element with said chamber, said valve responsive to a fluid pressure moveable to a position for preventing communication between said passage and said chamber and communicating said chamber with said source for moving said sleeve in one direction regardless of the position of said moveable element.

5. A control system for an aeronautical propeller having variable pitch blades moveable to a feathering position, a servo motor operatively connected to said blades, a speed control device for varying the pitch of said blades, a source of fluid under pressure, means including fluid passages responding to said speed control for directing fluid from said source to said servo motor, said speed responsive means comprising a pilot valve, a servo piston having fluid connections to said servo motor and said source and moveable as a function of the position of said pilot valve, a shuttle valve connected between the pilot valve and the servo piston, said shuttle valve including a two positional valve element having one side connected to the fluid pressure egressing from said pilot valve, a drain, the other side of said moveable valve element connected to drain when said pilot valve responds to the speed responsive means and held in one position by the pressure of the fluid regulated by the pilot valve, means for feathering the blades of the propeller, said valve element responsive to said feathering means for moving to another position for bypassing said pilot valve and communicating said source with said servo piston whereby said servo piston moves to communicate said servo motor directly with said source regardless of the position of the pilot valve.

References Cited by the Examiner
UNITED STATES PATENTS
2,943,686    7/60    Luiz et al. _____ 170—135.72
FOREIGN PATENTS
227,429    3/60    Australia.

EDGAR W. GEOGHEGAN, *Primary Examiner.*
EMILE PAUL, JULIUS E. WEST, *Examiners.*